United States Patent [19]
Kuenzig et al.

[11] 3,939,721
[45] Feb. 24, 1976

[54] MASTER LINK ASSEMBLY

[76] Inventors: Frederick J. Kuenzig, 16 Bob White Way, Weatogue, Conn. 06089; Joseph V. Montano, 120 Amherst St., Hartford, Conn. 06106

[22] Filed: Jan. 15, 1975

[21] Appl. No.: 541,267

[52] U.S. Cl. .................................... 74/258
[51] Int. Cl.² .................. F16G 13/02; F16G 13/08
[58] Field of Search ....... 74/254, 258, 245 R, 251 R

[56] References Cited
UNITED STATES PATENTS

| | | | |
|---|---|---|---|
| 3,643,517 | 2/1972 | Paul | 74/258 |
| 3,709,054 | 1/1973 | Montano | 74/258 |
| 3,885,445 | 5/1975 | Montano | 74/250 R |

*Primary Examiner*—Benjamin W. Wyche
*Assistant Examiner*—Allan R. Burke
*Attorney, Agent, or Firm*—Spencer T. Smith

[57] ABSTRACT

A master link assembly for releasably coupling the opposing ends of a series of articulated links to form a chain, wherein the opposing ends are defined by a pair of roller link assemblies each having a pair of opposing link plates with pitch holes extending between the opposing faces thereof and a pair of tubular bushings press-fitted thereinto comprising first and second link plates each including a pair of pitch holes extending between the opposing faces thereof, a pair of connecting pins selectively configured for slidable insertion into the tubular bushings and for insertion into the pitch holes of the first and second link plates, means for limiting the separation of the first and second link plates to a predetermined maximum separation, the limiting means including a bifurcated clip spring selectively configured for placement about the connecting pins adjacent the outer face of one of the first and second link plates, a locking plate having a U-shaped configuration, wherein the legs of the locking plate extend substantially perpendicularly from the top portion thereof and are in parallel spaced relation, the spacing being selected to correspond to the width of the spring clip, an aperture in the one link plate, an aperture in the locking plate top portion, and screw means for securing the locking plate to the one link plate.

4 Claims, 4 Drawing Figures

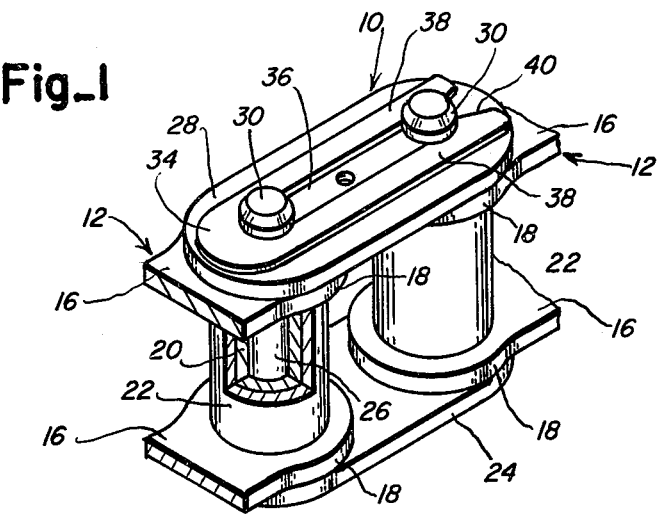
Fig_1
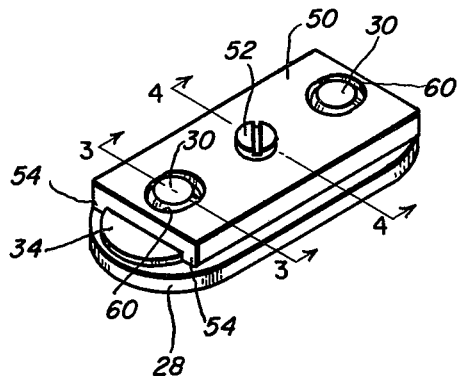
Fig_2
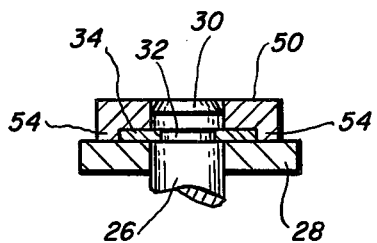
Fig_3
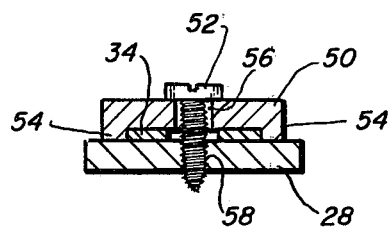
Fig_4

MASTER LINK ASSEMBLY

This invention relates to master link assemblies for releasably coupling opposing ends of articulated links of a power transmission chain.

Master link assemblies are often subjected to extreme short duration forces and these forces may displace one of the connecting pins of such an assembly either axially or angularly with respect to the other connecting pin thereof and such relative displacement may result in the spring clip, which secures the master link assembly, being partially or completely disassociated from the connecting pins whereby the master link assembly will fail.

It is an object of the present invention to provide a master link assembly, wherein the forces acting to transversly spread the spring clip will be selectively opposed by a compressive force which incrementally increases as the separation between the spring clip arms increases.

Other objects and advantages of the present invention will become apparent from the following portion of this specification and from the accompanying drawings which illustrate, in accordance with the mandates of the patent statutes presently preferred, embodiment incorporating the principles of the invention.

Referring to the drawings:

FIG. 1 is an oblique view of a master link assembly of a power transmission train;

FIG. 2 is an oblique view of the application portion of the master link assembly illustrated in FIG. 1 with a locking structure applied thereto;

FIG. 3 is a view of the master link assembly illustrated in FIG. 2 taken along the lines 2—2 thereof; and FIG. 4 is a view of the master link assembly illustrated in FIG. 2 taken along the lines 4—4 thereof.

Referring to the drawings, a master link assembly 10 made in accordance with the teachings of the present invention is illustrated. The master link 10 couples opposing ends of a series of articulated links made up of alternating roller link 12 and pin link (not shown) assemblies to define a link belt or chain.

Each roller link assembly 12 includes a pair of parallel link plates 16 which have circular end portions 18 for permitting articulation of the coupled links and which have a pair of pitch holes (not shown) extending between the opposing faces thereof. Each roller link assembly additionally includes a pair of tubular bushings 20 which are press fit into the pitch holes and a pair of optional rollers 22 which may be rotatably mounted on each of the bushings to minimize wear resulting from driving engagement with the teeth of a drive mechanism (not shown).

The alternating pin link assemblies (not shown) conventionally include a pair of parallel link plates which have circular end portions for permitting articulation of the coupled links and which have a pair of pitch holes extending between the opposing faces thereof. Each of the pin link assemblies also includes a pair of cylindrical connecting rods or pins which are secured to one link plate and are selectively sized for slidable insertion into roller assembly tubular bushings. The pins are either drive (press) or slip fit into the pitch holes of the other link plate.

The master link assembly 10 includes a first link plate 24 having a pair of pitch holes (not shown) which extend from the inner face to the outer face thereof, into which a pair of cylindrical connection pins 26 can be inserted. The cylindrical connection pins each have a selectively sized head (not shown) at one end to prevent the complete passage of these pins through the first link plate. Each of the connection pins 26 has a diametral dimension selected to allow slidable passage thereof through a tubular bushing 20 of a terminal roller link assembly and then into press or slip fit relationship with the pitch bores (not shown) of the second master link assembly link plate 28. The connection pins have a length selected so that when the master link assembly is assembled each pin will have a free end portion 30 which projects beyond the second link plate 28 a predetermined distance and which includes an annular groove 32 substantially continuous with the outer face of the second link plate.

To prevent the unintentional disassembly of the master link, a detachable "U"-shaped split spring clip 34 which has an inner slot portion 36 defined between the resiliently displaceable arms 38 thereof is located to engage the grooved recesses 32 defined in the free ends of the connection pins 26 to inhibit the separation of the opposing master link plates beyond a predetermined maximum separation. An inwardly projecting ridge 40 is defined on the free end of each of the retaining clip arms and these ridges securely locate the spring clip about the two projecting portions of the connection pins and inhibit lateral displacement thereof across the face of the adjacent master link plate.

The integrity of the assembled master link is assured by a locking plate 50 which is secured to the top link plate by means of a self tapping screw type 52. The locking plate has a U-shaped configuration with the opposing parallel legs 54 thereof having a height corresponding to the thickness (height) of the spring clip and having a separation corresponding to the width of the spring clip. When the locking plate is positioned over the spring clip as illustrated in FIGS. 2 and 3, the legs of the locking plate lie proximate to and extend parallel to the spring clip arms 38 for a substantial portion of the length thereof.

The locking plate accordingly functions as a spring member restraining the separation of the spring clip arms. The thickness of the locking plate is chosen so that it will develop sufficient compressive forces which increase with spring clip separation when the spring clip arms are spread by disassociation forces arising from use of the power transmission chain to overcome these disassociation forces and limit the separation of the spring clip to a width selected to assure that the spring clip will not become disassociated from the connecting pins. Since the locking plate functions as a spring in this manner, it can effectively respond to repeated severe stressing without failure.

The screw extends through a hole 56 in the top portion of the locking plate and into threaded engagement with a tapped hole 58 in the upper cover plate.

In the preferred embodiment, the locking plate extends laterally beyond the connecting pins 26 and appropriate slots or apertures 60 are defined in the top portion of the locking plate to receive the connecting pins and permit the top portion of the link plate to lie proximate the top surface of the spring clip. The spring clip is accordingly prevented from bowing outwardly and this assures that the spring clip will not become disassociated from the connecting pins.

What is claimed is:

1. A master link assembly for releasably coupling the opposing ends of a series of articulated links to form a chain, wherein the opposing ends are defined by a pair of roller link assemblies each having a pair of opposing link plates with pitch holes extending between the opposing faces thereof and a pair of tubular bushings press fitted thereinto comprising first and second link plates each including a pair of pitch holes extending between the opposing faces thereof, a pair of connecting pins selectively configured for slidable insertion into the tubular bushings and for insertion into the pitch holes of said first and second link plates, means for limiting the separation of said first and second link plates to a predetermined maximum separation, said limiting means including a bifurcated clip spring selectively configured for placement about said connecting pins adjacent the outer face of one of said first and second link plates, a locking plate having a U-shaped configuration, wherein the legs of said locking plate extend substantially perpendicularly from the top portion thereof and are in parallel spaced relation, said spacing being selected to correspond to the width of said spring clip an aperture in said one link plate, an aperture in the top portion of said locking plate, and screw means for securing said locking plate to said one link plate.

2. A master link assembly according to claim 1, wherein the height of said locking plate legs is selected to correspond to the height of said spring clip.

3. A master link assembly according to claim 2, wherein said one link plate has a length greater than the distance between said connecting pins and further includes a pair of aperture means for selectively receiving the portions of said connecting pins extending beyond said spring clip.

4. A master link assembly according to claim 1, wherein said link plate aperture is tapped.

* * * * *